United States Patent [19]
Berman et al.

[11] Patent Number: 6,129,476
[45] Date of Patent: Oct. 10, 2000

[54] BREAKAWAY PRECISION ROBOT END EFFECTOR

[75] Inventors: Russell Todd Berman; Carl Robert Mendel; William T. Sprague, all of San Jose, Calif.

[73] Assignee: International Business Machines Corporation, Armonk, N.Y.

[21] Appl. No.: 09/192,411

[22] Filed: Nov. 16, 1998

[51] Int. Cl.[7] .................................................... F16B 7/06
[52] U.S. Cl. ......................... 403/229; 403/315; 403/220; 403/59; 901/49
[58] Field of Search .................................. 403/229, 228, 403/221, 220, 315, 57, 59, 316; 901/49, 45

[56] References Cited

U.S. PATENT DOCUMENTS

| | | |
|---|---|---|
| 4,557,661 | 12/1985 | Fischer et al. . |
| 4,639,184 | 1/1987 | Knasel et al. . |
| 4,741,642 | 5/1988 | Carlton ................................ 403/229 X |
| 4,786,769 | 11/1988 | Knasel et al. . |
| 4,954,005 | 9/1990 | Knasel et al. . |
| 5,086,901 | 2/1992 | Petronis et al. ........................ 901/49 X |
| 5,328,209 | 7/1994 | Cromwell ............................. 403/229 X |
| 5,579,685 | 12/1996 | Raio ..................................... 403/229 X |

OTHER PUBLICATIONS

Robotic Accessories Brochure "Uni–Coupler™ Safety Joints".
Robotic Accessories Brochure "Versa–Matic™ Safety Joints".

Primary Examiner—Lynne H. Browne
Assistant Examiner—John R. Cottingham
Attorney, Agent, or Firm—Douglas R. Millett; Felsman, Bradley, Vaden, Gunter & Dillon, LLP

[57] ABSTRACT

An end effector has a base on one end for mounting to an end of a robot. A mount plate is fastened to the base. The end effector also has a cylindrical body to which is mounted a mating plate. Each of these components have axial holes which align with one another. The mount plate has a pair of precision-ground bumps which mate with a pair of dimples in the mating plate. One matched bump and dimple pair is smaller in diameter than the other pair to facilitate alignment between the base and the body. The end effector also has a retaining extension spring which extends between the base and the body in tension. During routine operation, the robot moves the end effector and a tool fixture at its distal end to assemble components such as in a pick-and-place tasks. In the event that the end effector crashes into an object, the body will rotate away from the base and the bumps slide out of the dimples. The spring keeps the parts together as the base remains rigidly mounted to the robot arm and the body deflect away. After the collision, the end effector is reset by reseating the bumps in the dimples.

13 Claims, 2 Drawing Sheets

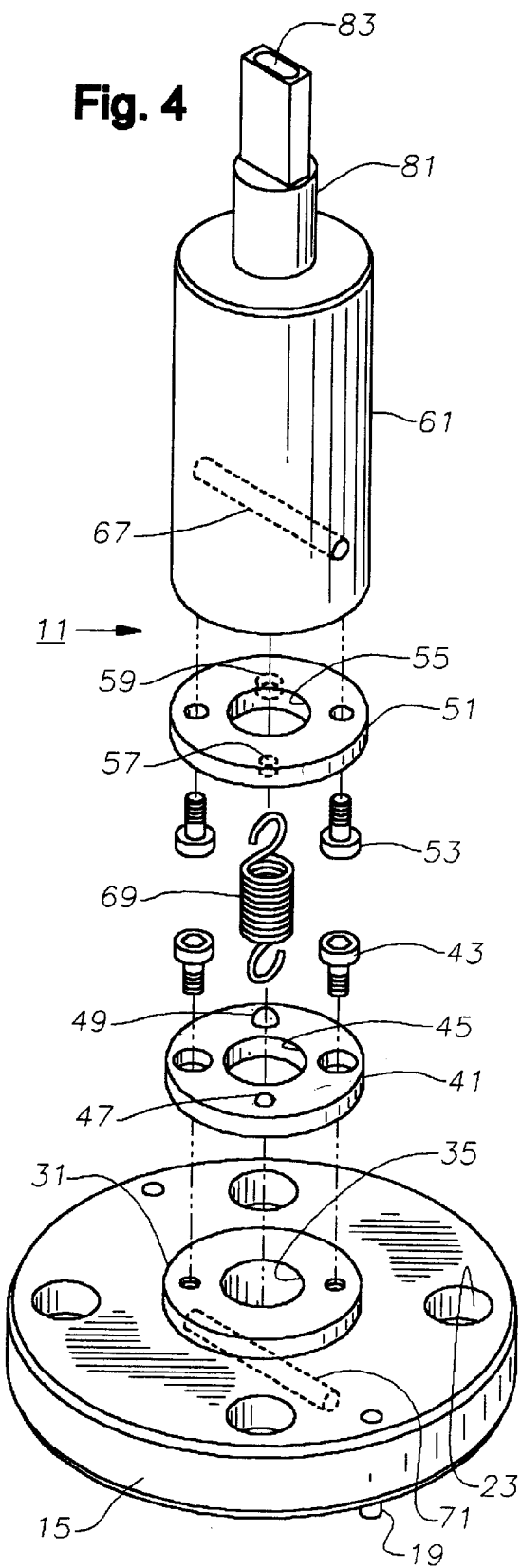
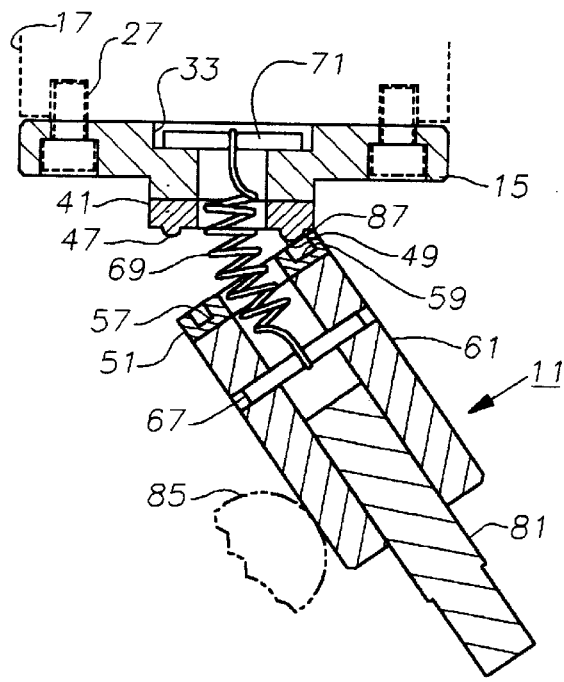

BREAKAWAY PRECISION ROBOT END EFFECTOR

TECHNICAL FIELD

This invention relates in general to high precision end effectors for robots and in particular to a breakaway high precision robot end effector.

BACKGROUND ART

High speed robots for small scale assembly utilize an end effector which places components in very precise locations. Typically, high precision end effectors must be very stiff in order to be repeatable. Any compliance in the design generally leads to a less repeatable mechanism. However, should a robot with a stiff end effector accidentally crash into a stationary object, the deceleration shock is transferred directly to the robot's transmission, and usually results in costly damage and significant downtime.

Several end effectors have been designed to withstand low speed crashes with high repeatability. One prior art design, Robotic Accessories' Uni-Coupler Safety Joint, model 4419, is capable of deflecting as much as 15 degrees from the axis of the end effector. This limitation renders that design useless for high speed crash protection. Although this model also includes an electrical switch that will cut power to the robot during a high speed crash, 15 degrees of deflection is insufficient to protect the robot. Moreover, the end effector can return to within only 0.002 inches of its original position after it is struck. This level of precision is inadequate for many applications such as head gimbal assembly pick-and-place tasks.

Another prior art device, described in U.S. Pat. No. 4,557,661, has a pair of arms which are connected to a boom via "shear pins." If the arms encounter a force greater than some predetermined design load, the shear pins will break to allow the arms to separate from the boom before the robot sustains any significant damage. Like the previous design, an electrical kill switch is used for additional protection. In this case, it would take additional time to recover the end effector from a crash since it would have to be recalibrated and the shear pins would have to be replaced. Moreover, in any crash, a significant shock would have to be transferred to the robot before the shear pins actually broke. Finally, because the mechanical properties of the shear pins cannot be precisely controlled, it is not possible to accurately define a "predetermined failure load." An end effector that can survive a high speed crash along any trajectory while limiting the shock transmitted to the robot and maintaining repeatability is needed.

DISCLOSURE OF THE INVENTION

An end effector has a base on one end for mounting to an end of a robot. A mount plate is fastened to the base. The end effector also has a cylindrical body to which is mounted a mating plate. Each of these components have axial holes which align with one another. The mount plate has a pair of precision-ground bumps which mate with a pair of dimples in the mating plate. One matched bump and dimple pair is smaller in diameter than the other pair to facilitate alignment between the base and the body. The end effector also has a retaining extension spring which extends between the base and the body in tension.

During routine operation, the robot moves the end effector and a tool fixture at its distal end to assemble components such as in a pick-and-place tasks. In the event that the end effector crashes into an object, the body will rotate away from the base and the bumps slide out of the dimples. The spring keeps the parts together as the base remains rigidly mounted to the robot arm and the body deflect away. After the collision, the end effector is reset by reseating the bumps in the dimples.

BRIEF DESCRIPTION OF THE DRAWINGS

FIG. 4 is an exploded, lower isometric view of the end effector of FIG. 1.

FIG. 5 is a sectional view of the end effector of FIG. 1 during a collision with a stationary object.

BEST MODE FOR CARRYING OUT THE INVENTION

Figure 1:
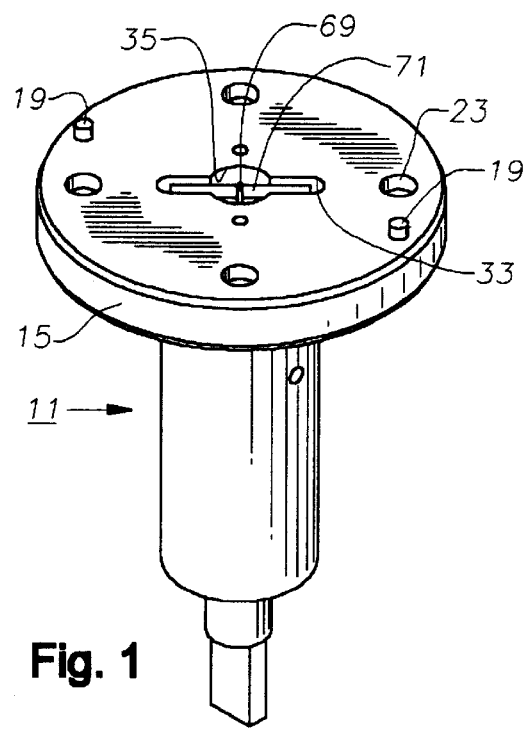
FIG. 1 is an upper isometric view of an end effector constructed in accordance with the invention.
Figure 2:
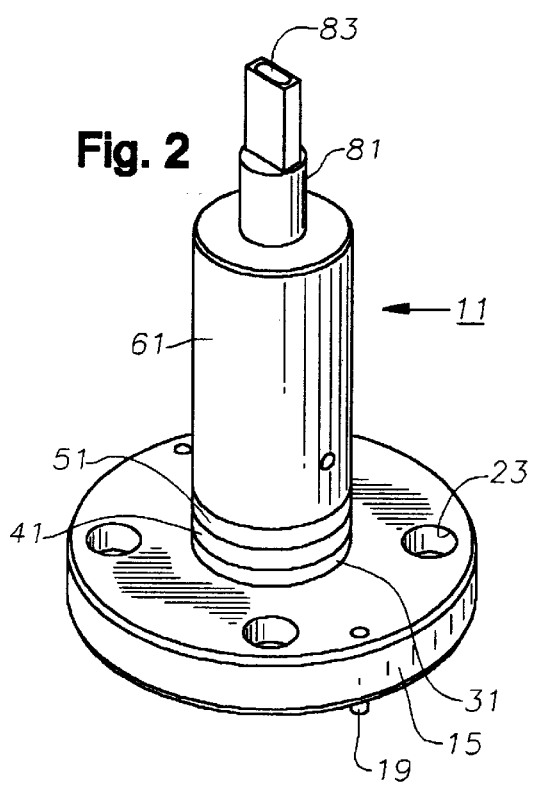
FIG. 2 is a lower isometric view of the end effector of FIG. 1.
Figure 3:
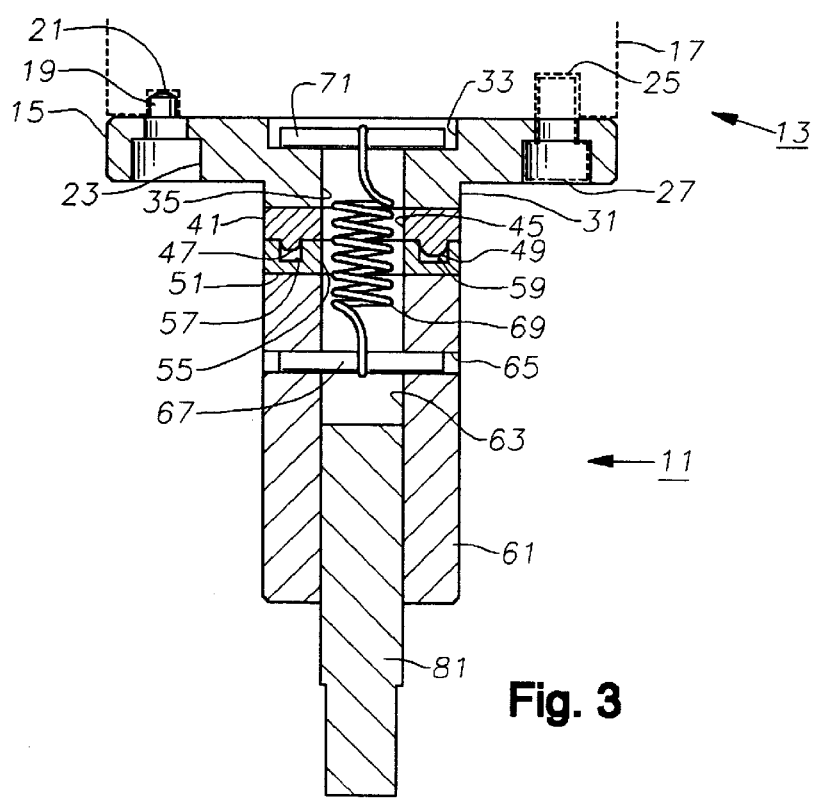
FIG. 3 is a sectional view of the end effector of FIG. 1.

Referring to FIGS. 1–4, the invention comprises an end effector 11 for a high speed, high precision assembly robot 13 (FIG. 3). End effector 11 has a cylindrical flange 15 on one end for mounting to an arm 17 of robot 13. Flange 15 has a pair of locating pins 19 which engage locating holes 21 in arm 17. Flange 15 also has a plurality of countersunk mounting holes 23 which align with mounting holes 25 in arm 17 to receive screws 27 for securing end effector 11 to arm 19.

End effector 11 has a cylindrical and integral hub 31 which protrudes from one side of and is coaxial with flange 15 (FIG. 4). The diameter of hub 31 is much smaller than a diameter of flange 15. A narrow oval recess 33 (FIGS. 1 and 3) is located in an opposite side of flange 15 and is joined to hub 31 by a central through hole 35. The diameter of hole 35 is smaller than that of hub 31.

A cylindrical base or mount plate 41 having hard-ground surfaces is fastened to the outer surface of hub 31 with screws 43. Mount plate 41 has a central through hole 45 which is the same diameter as and aligns with hole 35 in flange 15. Mount plate 41 also has a pair of precision-ground, hemispherical protuberances or bumps 47, 49 on its outer surface. Bump 47 is smaller in diameter than and is located opposite of bump 49.

End effector 11 has a cylindrical mating plate 51 which is very similar to mount plate 41. Mating plate 51 also has hard-ground surfaces and is fastened with screws 53 to one end of a body 61. After assembly, mating plate 51 is integral with body 61. Mating plate 51 has a central through hole 55 which is the same diameter as and aligns with hole 45 in mount plate 41. Mating plate 41 also has a pair of precision-ground, cylindrical dimples or recesses 57, 59 on its outer surface. Recess 57 is smaller in diameter than and is located opposite of recess 59. Recesses 57, 59 are precisely sized so that their diameters closely receive and engage the maximum diameters of bumps 47, 49, respectively.

Referring to FIG. 3, body 61 is an elongated cylindrical member with an axial hole 63 which is the same diameter as and aligns with holes 35, 45 and 55. Body 61 has a diametrical hole 65 which contains a precision-ground pin or dowel 67. Dowel 67 is perpendicular to an axis of hole 63 and press-fit into hole 65. One end of a retaining extension spring 69 is secured to dowel 67. The other end of spring 69 is secured to a second dowel 71 located in recess 33 such that spring 69 is kept in tension at all times. In the embodiment shown, dowel 71 spans recess 33 perpendicular to an axis of hole 35, but is not rigidly mounted to flange 15. In the preferred embodiment, each dowel 67, 71 has a shallow circumferential groove (not shown) located at its midpoint for maintaining spring 69 in the center of holes 35, 45, 55 and 63. Body 61 also has a tool member 81 rigidly mounted in and extending from hole 63. Tool member 81 has a receptacle 83 in its distal end (FIG. 2) which is provided for receiving a variety of tool fixtures (not shown). In operation, end effector 11 is mounted to the end of robot arm 17 (FIG. 3). Spring 69 holds mating plate 51 and body 33 tight against mount plate 41 and flange 15 (FIGS. 1–3). Since recesses 57, 59 completely receive bumps 47, 49 the contact surfaces of plates 41, 51 abut one another, giving end effector 11 a smooth cylindrical profile. Body 61 will be coaxial with mounting plate 41 and hub 31 in its operational position. During routine operation, robot 13 moves end effector 11 and the tool fixture (not shown) mounted in receptacle 83 in all directions to assemble components such as in a pick-and-place tasks.

In the event that end effector 11 inadvertently crashes into a stationary object 85 (FIG. 5), body 61 will rotate away from flange 15. This is done so that the deceleration shock is absorbed by spring 69 instead of being transferred directly to the transmission of robot 13. When body 61 strikes object 85 in any direction which is perpendicular to its axis (indicated by arrow), the hemispherical shapes of bumps 47, 49 allow them to slide out of recesses 57, 59, respectively. During the collision, body 61 pivots along an outer edge 87 which is opposite object 85. Flange 15 and mount plate 41 remain rigidly mounted to arm 17 while body 61 and mating plate 51 deflect away up to 90 degrees relative to the axis of flange 15. Only spring 69 keeps the parts together.

After the collision, robot 13 is momentarily stopped so that end effector 11 may be reset. When body 61 is clear of object 61, spring 69 retracts body 61 back toward flange 15 until bumps 47, 49 reseat in recesses 57, 59. The different sizes of bumps 47, 49 ensures compliance and alignment and compliance between mount plate 31 and mating plate 51 so that body 61 will be properly repositioned on flange 15.

The invention has several advantages. The end effector can sustain high speed impacts with a stationary object from any in-plane direction without damaging the robot it is mounted to. The design is repeatable to within 0.0002 inches, which is an order of magnitude greater than prior art designs. After the crash, the end effector can be rapidly reassembled in seconds without loss of mechanical integrity.

While the invention has been shown or described in only some of its forms, it should be apparent to those skilled in the art that it is not so limited, but is susceptible to various changes without departing from the scope of the invention.

We claim:

1. An end effector for a robotic arm, comprising:
   a base adapted to be mounted to a robotic arm, the base having a contact face and a central axial hole;
   a body having a central axial hole which registers with the hole in the base, a first end which is adapted to receive a tool fixture, and a second end which has a contact face that mates with the contact face of the base while the body is in an operational position;
   a pair of hard-ground, hemispherical protuberances differing in size and protruding axially from one of the contact faces;
   a pair of hard-ground, cylindrical receptacles differing in size and located in the other of the contact faces, each of the receptacles closely receiving a maximum diameter of a respective one of the protuberances to orient the body on the base; and
   a spring extending within the holes of the base and the body, the spring being mounted in tension between the base and the body for retaining the body on the base and allowing the body to deflect away from the base in the event that the body strikes an object.

2. The end effector of claim 1, further comprising a hardened plate fastened to the contact face of each of the base and the body wherein the protuberances are integrally formed on one of the plates and the receptacles are integrally formed in the other of the plates.

3. The end effector of claim 1 wherein the body may be repeatably reattached to the base within 0.0002 inches due to tolerances between the protuberances and the receptacles.

4. The end effector of claim 1 wherein the protuberances and the receptacles are located substantially 180 degrees apart from each other.

5. The end effector of claim 1 wherein the the axis of the body deflects up to approximately 90 degrees relative to the axis of the base in any radial direction.

6. The end effector of claim 1, further comprising a pin mounted in the body perpendicular to the axis of the body; and
   a pin mounted in the base; and wherein
   the spring is secured between the pins.

7. An end effector for a robotic arm, comprising:
   a base adapted to be mounted to a robotic arm, the base having a contact face and a central axial hole;
   a body having a central axial hole which registers with the hole in the base, a first end which is adapted to receive a tool fixture, and a second end which has a contact face that mates with the contact face of the base while the body is in an operational position;
   a pair of hard-ground, hemispherical protuberances differing in size and protruding axially from one of the contact faces;
   a pair of hard-ground, cylindrical receptacles in the other of the contact faces, each of the receptacles closely receiving a maximum diameter of a respective one of the protuberances, the receptacles and their respective protuberances having different dimensions for maintaining a desired orientation between the body and the base such that the body may be repeatably reattached to the base within 0.0002 inches due to tolerances between the protuberances and the receptacles; and
   a spring extending within the holes of the base and the body, the spring being mounted in tension between the base and the body for retaining the body on the base and allowing the body to deflect away from the base up to approximately 90 degrees relative to the axis of the base in any radial direction in the event that the body strikes an object.

8. The end effector of claim 7 wherein the protuberances and respective ones of the receptacles are located substantially 180 degrees apart from each other.

9. The end effector of claim 7, further comprising a hardened plate fastened to the contact face of each of the base and the body, wherein the protuberances are integrally formed on one of the plates and the receptacles are integrally formed in the other of the plates.

10. The end effector of claim 7, further comprising a pin mounted in the body perpendicular to the axis of the body; and
    a pin mounted in the base; and wherein
    the spring is secured between the pins.

11. An end effector for a robotic arm, comprising:

a base adapted to be mounted to a robotic arm and having a central axial hole;

a hardened mounting plate fastened to the base, the mounting plate having a contact face and an axial hole that registers with the hole in the base;

a body having a central axial hole that registers with the hole in the base, a tool end adapted to receive a tool fixture, and a mounting end;

a hardened mating plate fastened to the mounting end of the body, the mating plate having a contact face that mates with the contact face of the mounting plate while the body is in an operational position;

a pair of hard-ground hemispheres differing in size and formed on one of the contact faces;

a pair of hard-ground, cylindrical bores differing in size and formed in the other of the contact faces, each of the bores closely receiving a maximum diameter of a respective one of the hemispheres, the bores and their respective hemispheres having different dimensions for maintaining a desired orientation between the body and the base such that the body may be repeatably reattached to the base within 0.0002 inches due to tolerances between the hemispheres and the bores; and a spring extending within the holes of the base and the body, the spring being mounted in tension between the base and the body for retaining the body on the base and allowing the body to deflect away from the base up to approximately 90 degrees relative to the axis of the base in any radial direction in the event that the body strikes an object.

12. The end effector of claim 11 wherein the hemispheres and respective ones of the bores are located substantially 180 degrees apart from each other.

13. The end effector of claim 11, further comprising:

a pin mounted in the body perpendicular to the axis of the body;

a pin mounted in the base; and wherein the spring is secured between the pins.

* * * * *